United States Patent
Houdek et al.

(10) Patent No.: US 12,042,000 B2
(45) Date of Patent: Jul. 23, 2024

(54) VISUAL COMMUNICATION SYSTEM ON HELMET MOUNTED VISUAL COMMUNICATION AND NAVIGATION SYSTEM

(71) Applicant: Qwake Technologies, Inc., San Francisco, CA (US)

(72) Inventors: Phil Houdek, San Jose, CA (US); Mike Ralston, Mountain View, CA (US); Omer Haciomeroglu, Austin, TX (US); Sam Cossman, Austin, TX (US)

(73) Assignee: Qwake Technologies, Inc., San Francisco, CA (US)

( * ) Notice: Subject to any disclaimer, the term of this patent is extended or adjusted under 35 U.S.C. 154(b) by 0 days.

(21) Appl. No.: 18/371,506

(22) Filed: Sep. 22, 2023

(65) Prior Publication Data
US 2024/0099414 A1 Mar. 28, 2024

Related U.S. Application Data

(60) Provisional application No. 63/409,205, filed on Sep. 22, 2022.

(51) Int. Cl.
*A42B 3/30* (2006.01)
*G06F 3/02* (2006.01)
*G06F 3/0487* (2013.01)
*G08B 5/36* (2006.01)

(52) U.S. Cl.
CPC .............. *A42B 3/30* (2013.01); *G06F 3/0202* (2013.01); *G06F 3/0487* (2013.01); *G08B 5/36* (2013.01)

(58) Field of Classification Search
CPC ...... G06F 1/163; G06F 3/0487; G06F 3/0202; A42B 3/30; A42B 3/042; G08B 5/36; G08B 21/02
See application file for complete search history.

(56) References Cited

U.S. PATENT DOCUMENTS

| | | | | |
|---|---|---|---|---|
| 8,908,389 B2 * | 12/2014 | Teetzel | ...................... | F41H 1/04 2/205 |
| 9,101,175 B2 * | 8/2015 | Redpath | ................... | H05K 3/40 |
| 9,532,621 B2 * | 1/2017 | Redpath | ................... | A42B 3/04 |
| 10,088,911 B2 * | 10/2018 | Saez | ........................ | A42B 3/22 |
| 10,368,602 B2 * | 8/2019 | Dodson | ................ | A42B 3/0426 |
| 10,779,604 B2 * | 9/2020 | Lebel | ....................... | A42B 3/16 |
| 11,113,942 B1 * | 9/2021 | Wade | ..................... | G08B 31/00 |

(Continued)

*Primary Examiner* — Vinh T Lam
(74) *Attorney, Agent, or Firm* — Marton Ribera Schumann & Chang LLP; Chien-Ju Alice Chuang

(57) ABSTRACT

The technology described herein relates to a visual communication system for a helmet mounted visual communication and navigation system. A visual communication system may include a pointing laser on a vision module pointing forward in a direction of a user's point of view (POV), a rear communication light configured to project light in a backward direction from the user's POV, a graphical user interface (GUI) on a heads up display (HUD), and user control buttons configured to control the pointing laser, the rear communication light, and elements of the GUI. Users of such a visual communication system may include emergency response personnel and critical workers, and the GUI may display various vision modes directed to situations that may arise out of an emergency response, military, law enforcement, public safety effort or mission.

20 Claims, 14 Drawing Sheets

(56) References Cited

U.S. PATENT DOCUMENTS

| | | | | |
|---|---|---|---|---|
| 11,253,022 | B2* | 2/2022 | Frejd | A42B 3/288 |
| 11,287,292 | B2* | 3/2022 | Kitain | G02B 27/0176 |
| 11,419,382 | B2* | 8/2022 | Teetzel | A42B 3/04 |
| 11,583,027 | B1* | 2/2023 | Klaftenegger | A63G 31/00 |
| 11,915,376 | B2* | 2/2024 | Ralston | G06F 3/011 |
| 2013/0086722 | A1* | 4/2013 | Teetzel | A42B 3/04 |
| | | | | 2/2.5 |
| 2014/0000013 | A1* | 1/2014 | Redpath | H05K 1/028 |
| | | | | 29/592.1 |
| 2015/0305425 | A1* | 10/2015 | Redpath | A42B 3/042 |
| | | | | 29/829 |
| 2016/0355126 | A1* | 12/2016 | Anderson | A42B 3/0453 |
| 2017/0150769 | A1* | 6/2017 | Lebel | H04R 1/1066 |
| 2017/0202293 | A1* | 7/2017 | Rossi, Jr. | F21V 5/04 |
| 2019/0208854 | A1* | 7/2019 | Teetzel | A42B 3/0433 |
| 2021/0059344 | A1* | 3/2021 | Ralston | G06F 3/013 |

* cited by examiner

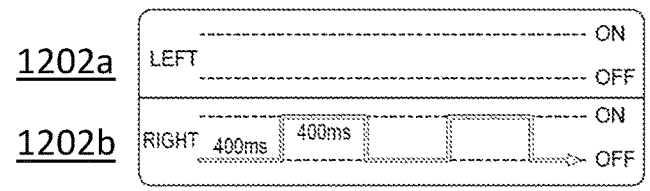
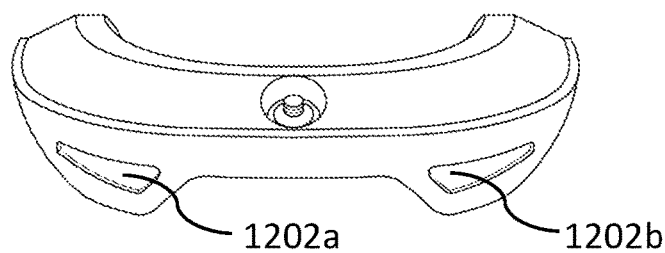
FIGURE 12A
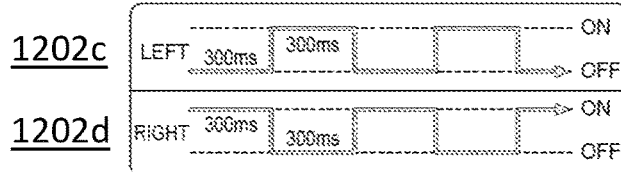
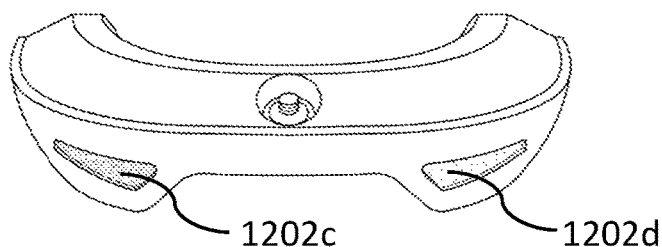
FIGURE 12B

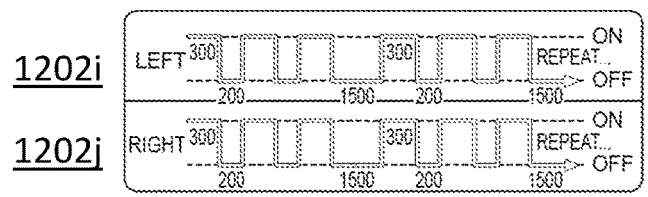
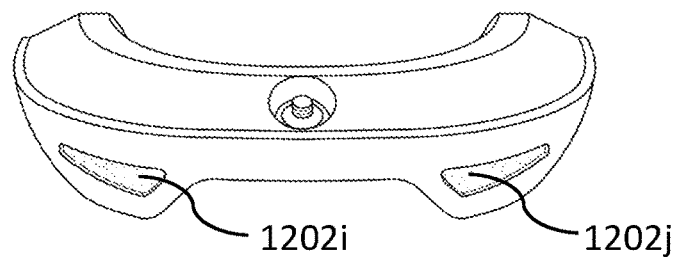
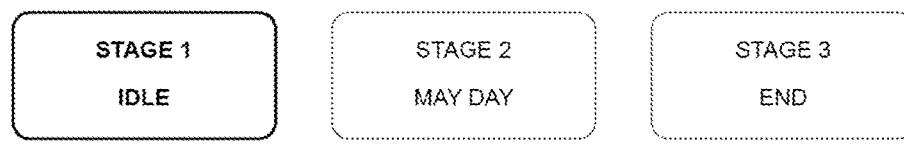
FIGURE 12E
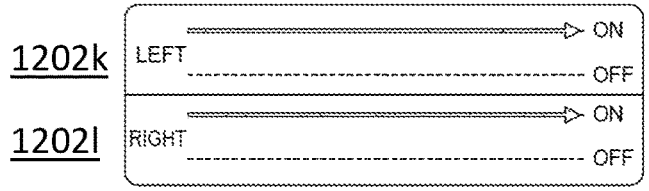
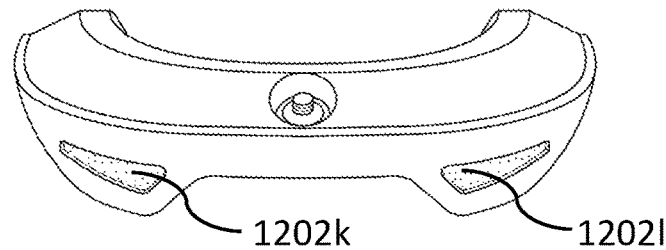
FIGURE 12F
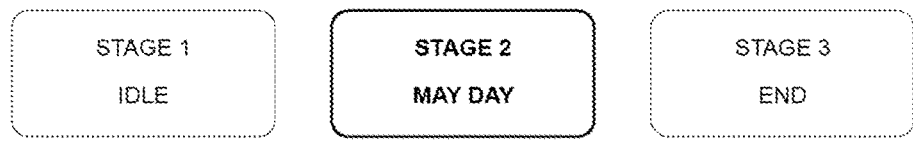

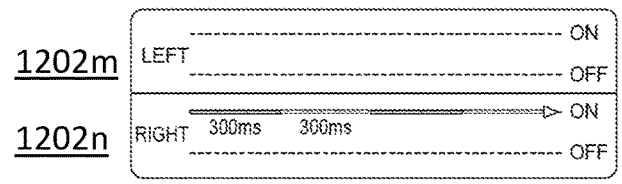
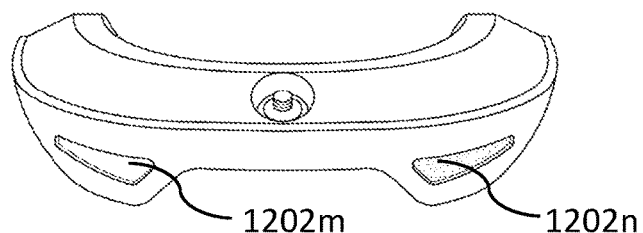
FIGURE 12G
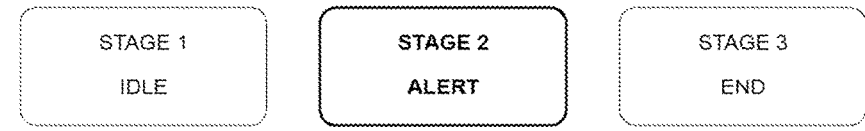
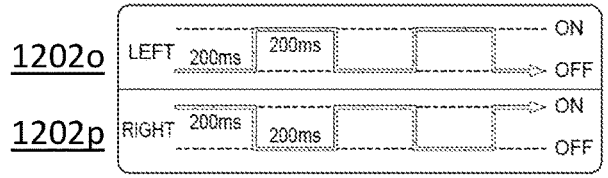
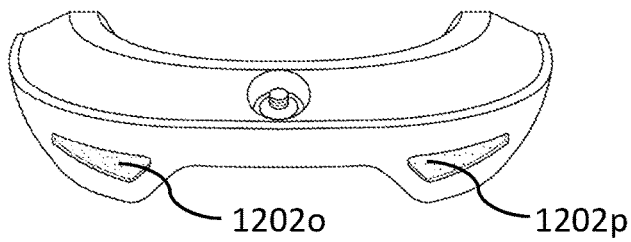
FIGURE 12H

VISUAL COMMUNICATION SYSTEM ON HELMET MOUNTED VISUAL COMMUNICATION AND NAVIGATION SYSTEM

CROSS-REFERENCE TO RELATED APPLICATIONS

This application claims priority to U.S. Provisional Patent Application No. 63/409,205 entitled "Hands-Free Visual Communication System for a Helmet Mounted Navigation and Communications System," filed Sep. 22, 2022, the contents of which are hereby incorporated by reference in their entirety.

FIELD OF INVENTION

The present invention relates to fire fighting, military, and safety gear. More particularly, the invention is directed to a wearable helmet mounted visual communication and navigation system.

BACKGROUND OF INVENTION

Fire fighting, life safety situations, military, law enforcement, emergency rescues, public safety and other missions and exercises frequently create a need for emergency response personnel and other critical workers to be able to see in the dark and through smoke. In such situations, navigation and communications gear that can provide emergency response personnel with more information to safely and quickly operate is essential. Conventional solutions include handheld thermal cameras, handheld radios, shoulder microphones, face mask mounted microphones and radios, flashlights, and physical tags. However, handheld implementations are cumbersome in emergency situations, and occupy hands that are needed for other tasks. Handheld implementations also often operate at a relatively larger distance from a user's eye, which increases the likelihood that smoke will obscure the visual path between the user's and the display screen.

Problems with existing solutions for mounting thermal cameras, or other navigation and communications gear, onto a user's wearable safety helmet or other wearable safety gear (i.e., onto a part of a uniform or other body-worn gear) includes unevenly weighing down a front or side of helmets and body-worn gear, snag hazards, and, when mounted onto other wearable safety gear, lack of ability to track a user's head motion.

Therefore, a visual communication system on a helmet mounted visual communication and navigation system is desirable.

BRIEF SUMMARY

The present disclosure provides for a visual communication system on a helmet mounted visual communication and navigation system. A visual communication system may include: a pointing laser on a vision module, the pointing laser configured to point forward in a direction of a user's point of view (POV); a rear communication light configured to project light in a backward direction from the user's POV; a graphical user interface (GUI) on a heads up display (HUD); and a user control button configured to control one, or a combination, of the pointing laser, the rear communication light, and one or more elements of the GUI. In some examples, the pointing laser and the rear communication light are configured to indicate one or more visual signals relating to an emergency response. In some examples, a user manipulation of the user control button is configured to cause an action by the one, or a combination, of the pointing laser, the rear communication light, and one or more elements of the GUI. In some examples, the user manipulation comprises one, or a combination, of a quick press, a long press, a press and hold, and a pattern of presses. In some examples, the user manipulation of the user control button is configured to cause the rear communication light to toggle between an on and off mode. In some examples, the user manipulation of the user control button is configured to cause the rear communication light to indicate one, or a combination, of a connecting signal, a dispatched signal, an idle signal, a may day signal, an evacuation signal, a personnel accountability signal, a response signal, a safe signal, an assigned signal, an evacuation end signal, a may day end signal, and an other end signal.

In some examples, the user manipulation of the user control button is configured to cause a change to a vision mode. In some examples, the vision mode is configured to cause the GUI to display a compass. In some examples, the vision mode is configured to cause the GUI to display a map. In some examples, the vision mode is configured to cause the GUI to display an enhanced visualization of an environment from the user's POV. In some examples, the vision mode is configured to cause the GUI to display one or more elements configured to assist a user in performing one, or a combination, of the following: locating an exit, finding a location of a may day alert by a downed response personnel, and following a path to a safe location. In some examples, the one or more elements comprises one, or a combination, of a message section, an alerts section, and a navigation section.

In some examples, the user manipulation of the user control button is configured to cause the pointing laser to indicate a signal using one, or a combination, of a color, a brightness, and a blinking pattern. In some examples, the system also includes an indicator light on the vision module, the indicator light configured to display a color and/or a pattern to indicate one, or a combination, of whether the vision module is receiving power, whether there is a hardware problem, whether there is a software problem. In some examples, the rear communication light comprises a light-emitting diode (LED) light. In some examples, the user control button is further configured to perform one, or a combination, of the following: select a response, dismiss a message, acknowledge an alert, dismiss a notification, and initiate a may day alert. In some examples, the user control button is further configured to cause the rear communication light to exhibit a light pattern. In some examples, the user control button is further configured to cause the rear communication light to change color. In some examples, the user control button comprises two or more buttons. In some examples, at least two user control buttons are separated by a finger placement guide configured to assist a user wearing gloves in distinguishing between a location of the at least two user control buttons.

BRIEF DESCRIPTION OF THE DRAWINGS

Various non-limiting and non-exhaustive aspects and features of the present disclosure are described hereinbelow with references to the drawings, wherein:

FIGS. 12A-12H are diagrams showing exemplary visual communication signals being expressed by rear communication lights.

Figure 1A:
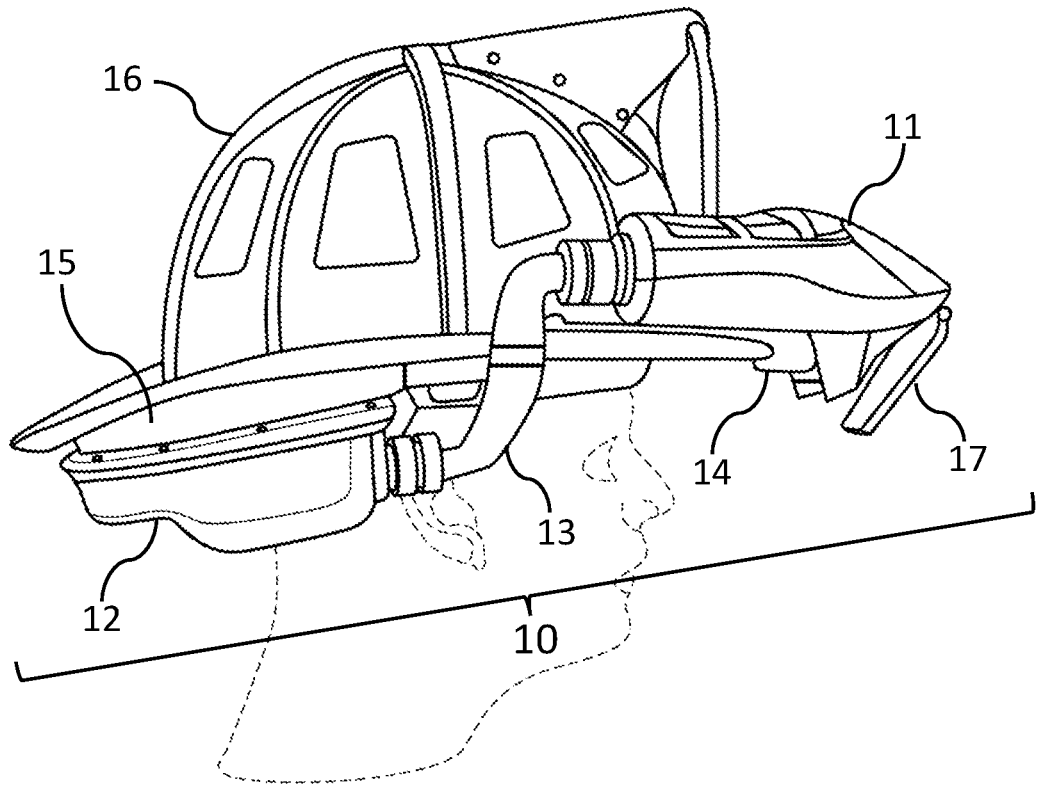
FIGS. 1A-1B are a side and a perspective view of an exemplary helmet with a balanced helmet mounted visual communication and navigation system, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a visual communication system on a helmet mounted visual communication and navigation system. A helmet mounted visual communication and navigation system may include a vision module coupled to a front portion (e.g., a front surface) of a helmet, a compute module coupled to a rear (i.e., back) surface of the helmet, a cable that connects the vision module and the compute module, a first attachment element configured to removably couple the vision module to the helmet, a second attachment element configured to removably couple the compute module to the helmet. The vision and compute modules may provide navigation functions (e.g., using lights, laser, camera, heads up display (HUD), navigation user interface, processing and compute for control thereof) for the balanced helmet mounted visual communication and navigation system. The vision and compute modules also may provide communication functions (e.g., using lights, laser, user control buttons). The first attachment element may comprise mating features to the helmet's contours on a first side and to the vision module on a second side. The second attachment element may comprise mating features to the helmet's contours on a first side and to the compute module on a second side. The first and second attachment elements allow the vision module and compute module, respectively, to be attached to, and detached from, the helmet. In some examples, the vision module and compute module may be coupled to various different (e.g., varying designs) and unique (e.g., separate, user-specific) helmets. For example, the shape, pattern, number of adhesive mount pads, and other configurations, on a helmet-facing portion of a compute module attachment may be varied to match different types of helmets, while keeping shape and coupling elements of a compute module-facing portion of a compute module attachment matching that of a given compute module. For example, the module-facing side of a second attachment may be contoured to fit a compute module surface, this module-facing contour may be maintained across different types of helmets, while the helmet-facing side may be contoured to fit an inner helmet surface of the back portion of a helmet and may be varied across different types of helmets. This modular design allows for a given compute module to be removably coupled to different types of helmets. Similarly, the shape, pattern, helmet-coupling elements, and other configurations, on a helmet-facing portion of a vision module attachment may be varied to match different types of helmets, while keeping shape and coupling elements of a vision module-facing portion of a vision module attachment matching that of a given vision module. This modular design allows for a given compute module to be removably coupled to different types of helmets.

A visual communication and navigation system may be coupled to parts of a safety helmet and may comprise built-in thermal camera and other sensors, a HUD to view enhanced visual information (i.e., enhanced visualizations) comprising both raw and processed sensor data from said thermal camera and other sensors. The thermal camera and other sensors may include situational awareness sensors (e.g., cameras (e.g., a thermal imaging camera (TIC), a radiometric thermal camera, a drone camera), a spectrometer, a photosensor, a magnetometer, a seismometer, a gas detector, a chemical sensor, a radiological sensor, a voltage detector, a flow sensor, a scale, a thermometer, a pressure sensor, an acoustic sensor (e.g., selective active noise cancellation to facilitate radio communication), an inertial measurement unit, a GPS sensor, a speedometer, a pedometer, an accelerometer, an altimeter, a barometer, an attitude indicator, a depth gauge, a compass (e.g., fluxgate compass), a gyroscope, and the like) and biometric sensors to measure (e.g., monitor) health conditions and status of a user (e.g., a heart rate sensor, a blood pressure monitor, a glucose sensor, an electrocardiogram (e.g., EKG or ECG) sensor, an electroencephalogram (EEG) sensor, an electromyography (EMG) sensor, a respiration sensor, a neurological sensor, and the like). In some examples, the visual communication and navigation system also may include a pointing laser (e.g., for depth measurement in an extreme environment with low visibility, otherwise to help a user navigate, as well as a visual indication to other personnel of the user's presence and approximate location) and other tools.

The visual communication and navigation system may be helmet mounted such that the visual and other sensors can track a user's head motion and approximates where the user is looking so that the HUD may include the user's current point of view. For example, the HUD may be configured to display a representation of a user's environment from the user's point of view. The HUD display may face the user within the user's field of vision. Such a helmet mounted system also reduces snag hazard and allows for integration with streamlined emergency personnel and critical worker procedures and workflows.

The visual communication and navigation system may comprise two or more modules to be coupled at different locations on a helmet, the two or more modules configured to minimize the added moment of inertia to reduce a user's perceived mass of the system. The two or more modules may be strategically placed to wrap around inner and outer surfaces of a helmet largely using available, unused space within and around a helmet. The two or more modules may be configured to implement a cognitive load reducing platform comprising a plurality of sensors, a compute subassembly (e.g., processor, memory) configured to execute a cognitive enhancement engine (e.g., software-based engine configured to process sensor data into enhanced characterization data configured to provide contextual and physiological visual, auditory, and/or haptic cues and information), and an output device (e.g., HUD, other visual display, headphones, earbuds, other auditory output devices, haptic device, and the like).

The two or more modules may include a vision module comprising a heads up display (HUD) combiner subassembly, one or more user control buttons, a laser, an indicator light, a camera and other sensors, and a cable connection interface, or a sub-combination thereof, as described in more detail herein. The two or more modules also may include a compute module comprising at an internal core subassembly including least some of the electronics for operation of the visual communication and navigation system (e.g., a circuit board assembly, an antenna), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

In some examples, the visual communication and navigation system may include thermal protection features to protect electronic parts and systems, including heat resistant materials, insulation, heat reservoirs (e.g., heatsinks comprising phase change material to store heat dissipated from electronic parts and systems), heat spreaders, and the like.

Figure 1B:
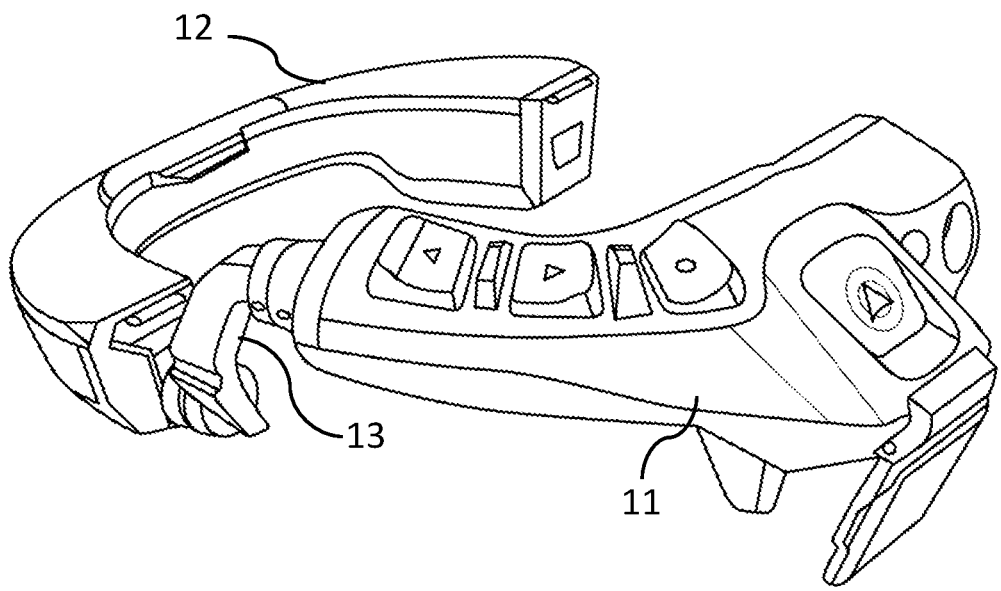

FIGS. 1A-1B are a side and a perspective view of an exemplary helmet with a balanced helmet mounted visual communication and navigation system, in accordance with one or more embodiments. A visual communication and navigation system 10 may be removably coupled (e.g., attached and detached using attachments 14-15) to helmet 16. Vision module 11 and compute module 12 are shown connected using cable 13 (e.g., comprising a system cable, a data cable, and/or other cables and wires). In some examples, vision module 11 attaches and detaches to vision module attachment 14 without tools, and compute module 12 similarly attaches and detaches to compute module attachment 15 without tools. Vision module attachment 14 and compute module attachment 15 may be more permanently coupled (e.g., adhesively bonded, mechanically attached) to helmet 16. In some examples, vision module attachment 14 may be coupled to a top surface of a front brim of helmet 16, as shown. In some examples, compute module attachment 15 may be coupled to a bottom surface of a back portion (e.g., brim) of helmet 16, as shown. Vision module 11 may include heads up display (HUD) combiner subassembly 17, which is shown in a partially open position wherein the display portion is flipped partially down (e.g., a position wherein the display is viewable by a user). As shown in FIG. 1B, a HUD may flip down into an open position to occupy a portion of a user's field of view. Said HUD may flip up into a closed position when not in use. In some examples, the HUD may be formed using materials able to withstand high heat, smoke-filled, and other extreme conditions. In some examples, the HUD may comprise a plurality of layers, including a world facing shell, a glass or plastic mirror or partial mirror, and a user facing shell, the world facing shell and user facing shell bonded, or otherwise secured, along their perimeter edge to create a sealed volume enclosing the mirror within. In some examples, the world facing shell and user facing shell may comprise a largely clear material configured to enable viewing of the glass display (e.g., a combiner glass configured to display a graphical user interface) and may be coated with hydrophilic material to minimize fogging and optical distortion from moisture (e.g., encourage water sheeting). In some examples, the world facing shell and user facing shell also may be treated with a coating, or may comprise a material, that is heat and/or debris resistant.

In some examples, vision module 11 may comprise a HUD combiner subassembly, one or more user control buttons, a laser, an indicator light, a camera and other sensors, and a cable connection interface, or a sub-combination thereof, as described in more detail herein. In some examples, compute module 12 may comprise an internal core subassembly including least some of the electronics for operation of the visual communication and navigation system (e.g., a circuit board assembly (e.g., CPU, other PCB or processing unit), memory, an antenna, and other computing components), heat management elements (e.g., heat reservoirs and heat spreaders), power module (e.g., battery module, charging module, power cord port, and other means of providing power to operate the visual communication and navigation system), or a sub-combination thereof, as described in more detail herein. In some examples, the compute module also may include a sensor (e.g., NFC tag reader, RFID tag reader, camera, scanner, combined NFC-RFID antenna, and the like). In some examples, the compute module also may comprise one or more lights as part of a visual communications system (e.g., controlled using manual inputs (e.g., user control buttons) and passive inputs (e.g., sensor data, communications data, and the like)).

Visual communication and navigation system 10 may comprise a thermal protection system including heat resistant materials, insulation, heat reservoirs (e.g., heat sinks comprising phase change material configured to store heat dissipated from electronic parts and systems), heat spreaders, as described herein.

Figure 2:
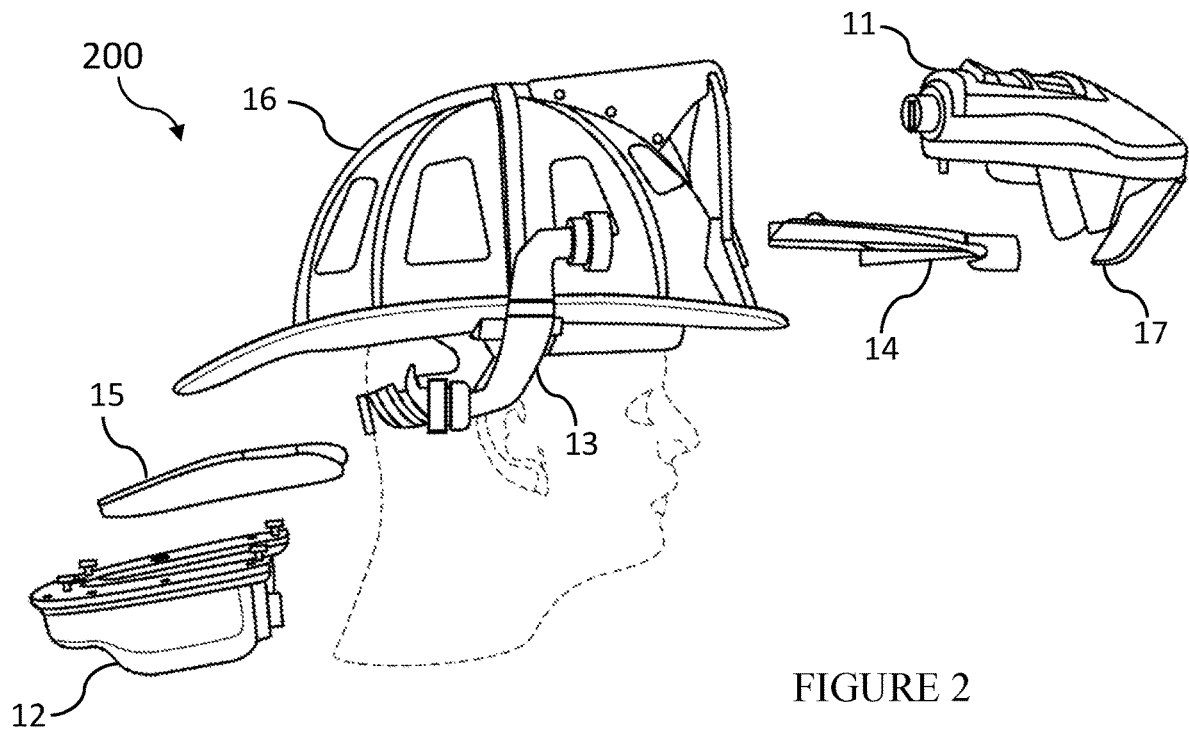
FIG. 2 is an exploded view of an exemplary helmet with a balanced helmet mounted visual communication and navigation system, in accordance with one or more embodiments.

FIG. 2 is an exploded view of an exemplary helmet with a balanced helmet mounted visual communication and navigation system, in accordance with one or more embodiments. All like-numbered elements in FIG. 2 are the same or similar to their corresponding elements in other figures. View 200 includes the same or similar vision module 11, compute module 12, cable 13, vision module attachment 14, compute module attachment 15, and helmet 16. In some examples, cable 13 may have one end removably coupled to vision module 11 and another end removably coupled to compute module 12. In some examples, cable 13 may comprise a housing, one or more electrical wires and/or light cables (e.g., coaxial, fiber optic, data, ethernet, twisted wire pairs, audio, HDMI, VGA, other video, and the like) housed (e.g., encased) within the housing, and two or more connector ends, each configured to physically, electrically, and communicatively connect to a module (e.g., vision module 11, compute module 12, and the like). In some examples, cable 13's housing may comprise heat resistant material. In some examples, cable 13's housing also may include insulation or other thermal protective features to protect electrical and/or light cables housed within from overheating. In other examples, cable 13's housing may be provided with a shape configured to approximately conform to a side contour of helmet 16 such that cable 13's housing does not jut out from helmet 16, thereby avoiding being a snag hazard (e.g., opportunity for snagging on other objects and surfaces with which the helmet, cable, and other parts of the helmet mounted visual communication and navigation system may contact). For example, as shown, said housing may be flatter left to right with a slight curve (e.g., a C-curve) so that one end connects with vision module 11 at least partly over the brim of helmet 16 and another end connects with compute module 12 at least partly under the brim of helmet 16. Also, as shown, said housing may be wider front to back to accommodate the volume of multiple cables and/or allow for cable angles due to tension or stiffness of materials. In some examples, said housing may have a slight double curve (e.g., an S-curve) in one dimension to reach corresponding connectors on two or more various modules. In other examples, cable 13's housing may comprise a flexible material able to take on any shape necessary to connect two or more modules and house any necessary electrical and light cables. In some examples, each end of cable 13 may comprise an interface for removably coupling to a corresponding connector on a module, mechanically (e.g., screwing or popping on and off) and electrically (e.g., male-female electrical, data, audio interfaces).

Figure 3:
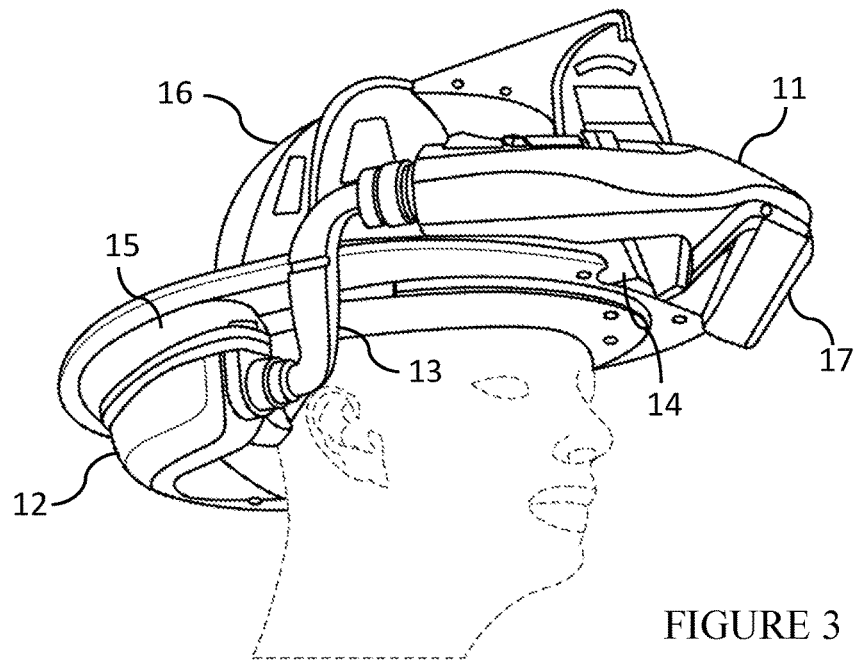
FIG. 3 is a perspective view of an exemplary helmet with a balanced helmet mounted visual communication and navigation system, in accordance with one or more embodiments.

FIG. 3 is a perspective view of an exemplary helmet with a balanced helmet mounted visual communication and navigation system, in accordance with one or more embodiments. All like-numbered elements in FIG. 3 are the same or similar to their corresponding elements in other figures.

Figure 4:
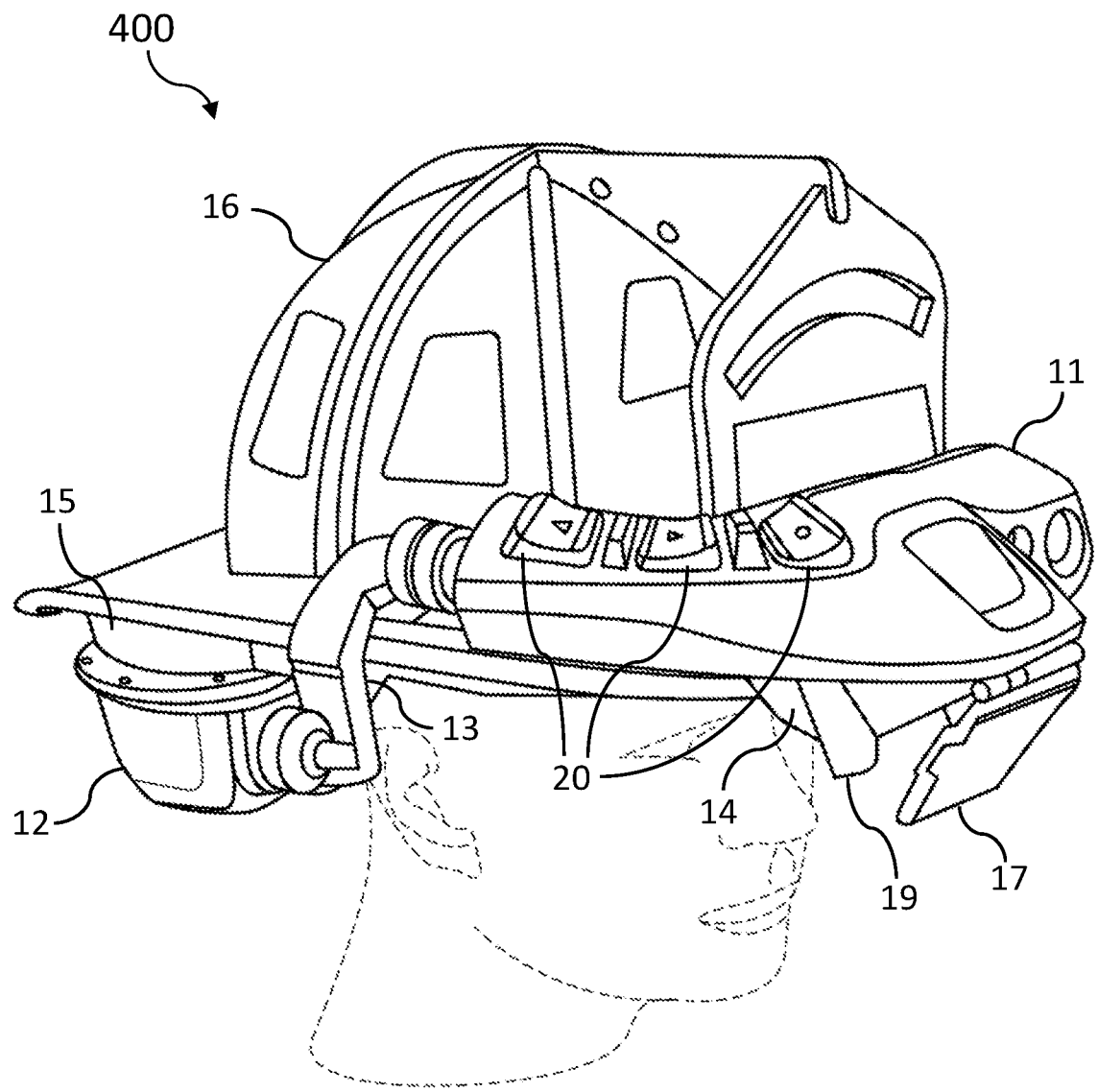
FIG. 4 is another perspective view of an exemplary helmet with a balanced helmet mounted visual communication and navigation system, in accordance with one or more embodiments.

FIG. 4 is another perspective view of an exemplary helmet with a balanced helmet mounted visual communication and navigation system, in accordance with one or more embodiments. All like-numbered elements in FIG. 4 are the same or similar to their corresponding elements in other figures. View 400 provides a top down perspective view that further shows an aperture 18, bumper(s) 19, and user control button(s) 20. In some examples, aperture 18 may be configured to provide an opening through which a thermal camera or other sensor may receive light and other sensory input. In some examples, aperture 18 may be covered with glass (e.g., germanium glass) or other material able to pass infrared light, for example, while providing an enclosure to maintain an ingress protected seal. In some examples, additional apertures may be provided on vision module 11 (e.g., for additional sensors, a laser, and the like).

In some examples, one or more bumper(s) 19 may be provided, for example, protruding down on either side of the HUD combiner subassembly 17 to protect the HUD combiner subassembly 17 from damage (e.g., from flying or falling debris, contact with obstacles, impact from normal wear and tear, and other impact from contact with surfaces and objects). In some examples, bumper(s) 19 may comprise elastomeric material.

In some examples, user control buttons 20 may control elements of a visual communications system, including one, or a combination, of a laser, lights (e.g., a rear communication (e.g., tail and/or brake) light facing backward on compute module 12, other lights on any module coupled to helmet 16 and/or coupled using cable 13), and any other visual communication unit or element on a helmet mounted visual communication and navigation system.

Figure 5:
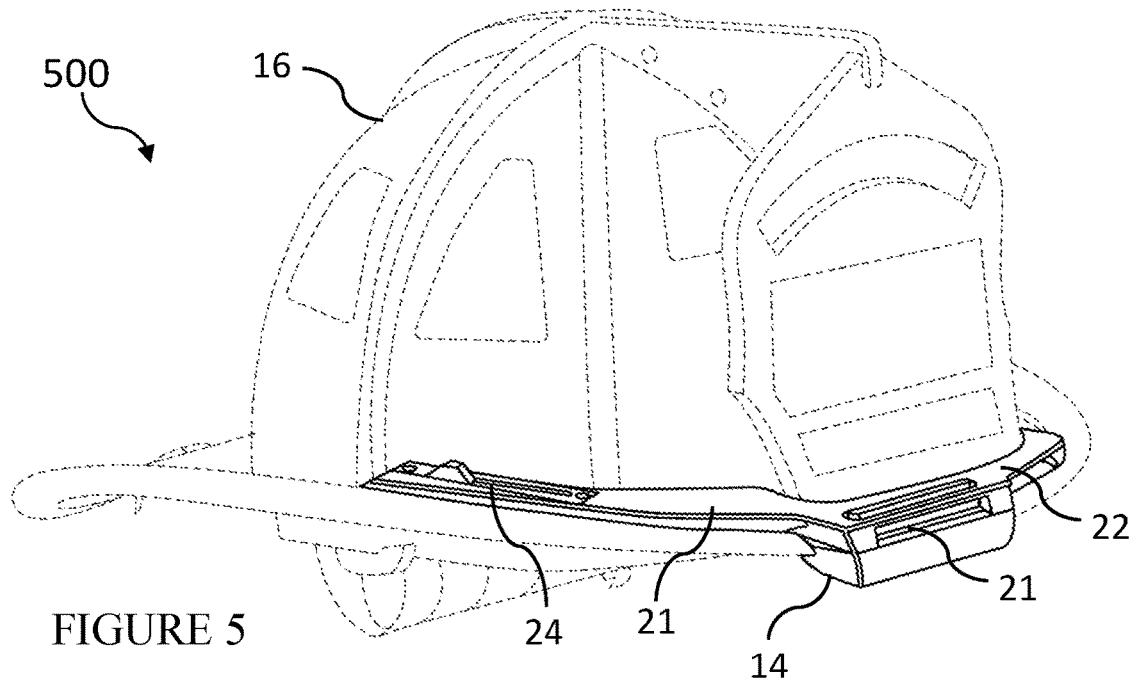
FIG. 5 is a perspective view of an exemplary attachment element configured to attach a vision module, in accordance with one or more embodiments.

FIG. 5 is a perspective view of an exemplary attachment element configured to attach a vision module, in accordance with one or more embodiments. All like-numbered elements in FIG. 5 are the same or similar to their corresponding elements in other figures. View 500 shows a vision module attachment 14 attached to a front portion (e.g., brim) of helmet 16. In some examples, vision module attachment 14 may include a latch pocket 21, a preload bumper 22, and a latch mechanism 24. Latch pocket 21 may comprise a recess configured to accept a protrusion on (e.g., protruding portion of) vision module 11, the recess configured to allow vision module 11 to lock into place. In some examples, preload bumper 22 may comprise a semi-soft elastomer, or other material configured to being deformed by application of physical pressure and to recover an original shape after removal of said physical pressure, which may be compressed to create a stable motion-free connection when vision module 11 is coupled to vision module attachment 14. When vision module 11 is coupled to vision module attachment 14, a surface of vision module 11 may be in contact with some or all of surface area 23 to provide added stability in said coupling. Latching mechanism 24 may comprise a sliding tab configured to latch onto a corresponding mating element on vision module 11 such that a protrusion of vision module 11 mates with latch pocket 21 when latching mechanism 24 latches onto said corresponding mating element on vision module 11. For example, a sliding tab on latching mechanism 24 may be configured to secure the vision module into a locked position wherein a protrusion on the mating element is received by latch pocket 21, wherein the sliding tab may be moved to an unlocked position to release vision module 11 from vision module attachment 14. In other examples, latching mechanism 24 may comprise any other mechanism enabling the removable coupling of vision module 11 to vision module attachment 14. The shape, pattern, helmet-coupling elements, and other configurations, on a helmet-facing portion of vision module attachment 14 may be varied to match different types of helmets, while keeping shape and coupling elements of a vision module-facing portion of vision module attachment 14 matching that of a given vision module 11. This modular design allows for a given compute module 11 to be removably coupled to different types of helmets.

Figure 6:
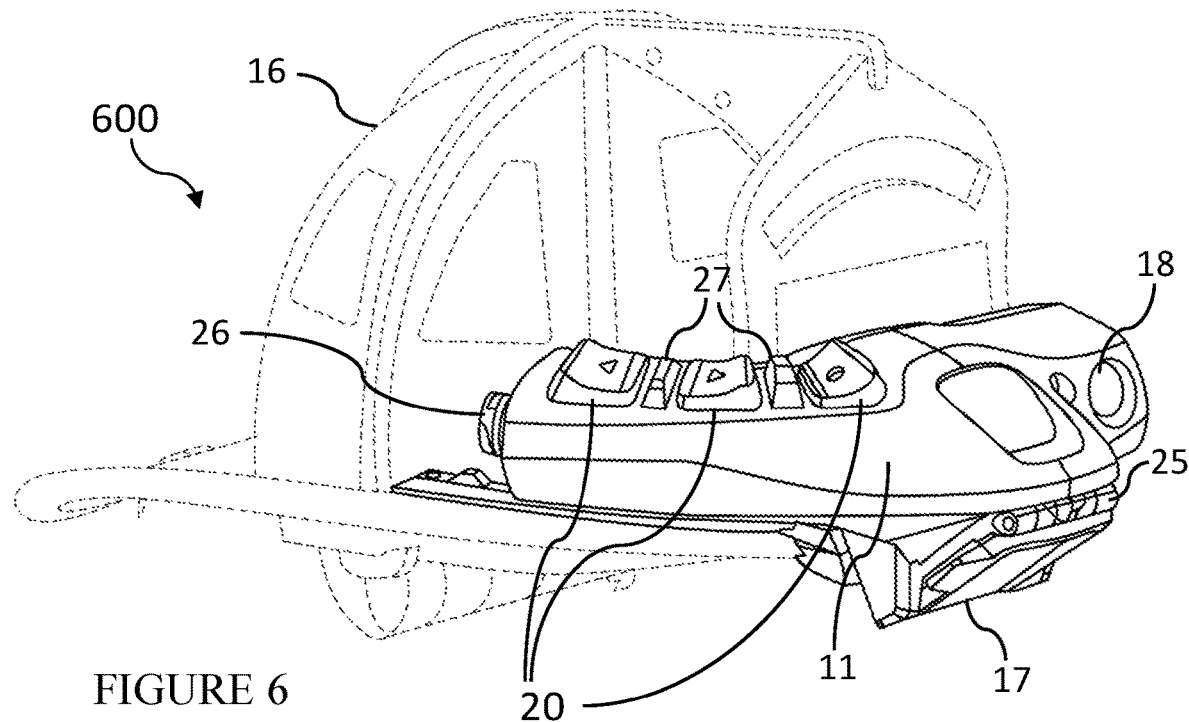
FIG. 6 is a perspective view of an exemplary vision module and its attachment element, in accordance with one or more embodiments.

FIG. 6 is a perspective view of an exemplary vision module and its attachment element, in accordance with one or more embodiments. All like-numbered elements in FIG. 6 are the same or similar to their corresponding elements in other figures. View 600 shows vision module 11 coupled to vision module attachment 14. As shown, vision module 11 includes HUD subassembly 17. HUD subassembly 17 comprises an axis of rotation and clutch mechanism 25, including a combiner pivot mechanism (e.g., pivot mechanism 103), which enables a combiner display portion of HUD subassembly 17 to be flipped to two or more positions (e.g., open, closed, up, down, partially open, partially closed, and other in between positions). In some examples, said combiner display may be adjusted to, and held open at, one or more angles.

Vision module 11 also may include a cable connection interface 26. In some examples, cable connection interface 26 may comprise an ingress protected locking electrical connector and may be configured to mate with a corresponding connection interface on an end of cable 13. In some examples, a set of user control buttons 20 may be separated by one or more finger placement guide 27, which may be molded onto, or as part of, a surface of vision module 11's housing.

Figure 7:
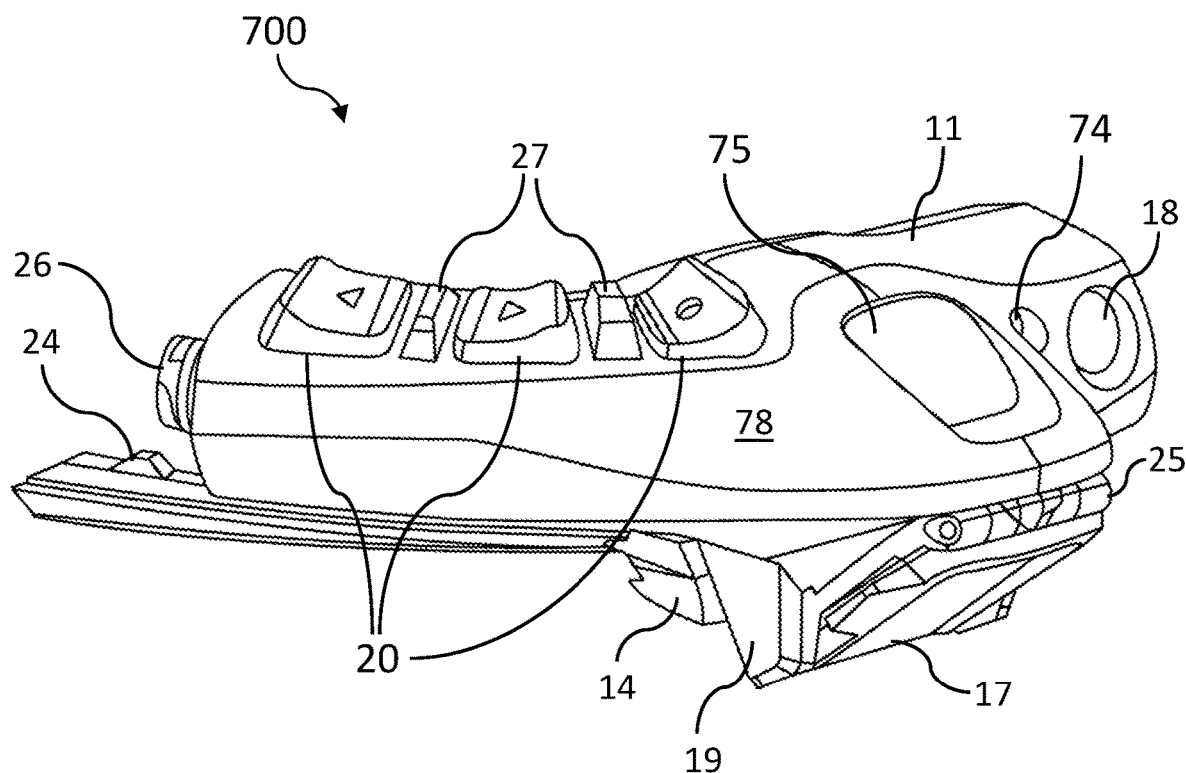
FIG. 7 is another perspective view of an exemplary vision module and its attachment element, in accordance with one or more embodiments.

FIG. 7 is another perspective view of an exemplary vision module and its attachment element, in accordance with one or more embodiments. View 700 shows vision module 11 coupled to vision module attachment 14, including HUD combiner subassembly 17, aperture 18, bumper(s) 19, user control button(s) 20, latching mechanism 24, axis of rotation and clutch mechanism 25, cable connection interface 26, and finger placement guide 27. All like-numbered elements in FIG. 7 are the same or similar to their corresponding elements in other figures. Also shown in view 700 is laser aperture 74, and housing regions 75 and 78. Laser aperture 74 may be configured to provide an exit aperture for a pointing laser. In some examples, housing region 75 may be configured to provide additional stiffness and for aesthetic purposes (e.g., break up housing surface, such as housing region 78, to make vision module 11 appear smaller, provide an area for company branding, and the like). Housing region 78 may be configured to minimally protrude out or away from helmet 16, and may be shaped (e.g., sculpted, contoured, otherwise formed) to reduce snag hazard (e.g., with a smooth surface). In some examples, housing region 78 also may provide a surface for a user to rest a part of their hand while operating user control button(s) 20. In some examples, finger placement guide 27 may be configured (e.g., shaped, placed, have a given height) to assist a user wearing gear (e.g., gloves and other protective gear) in distinguishing between location and function of two or more user control button(s) 20.

Figure 8:
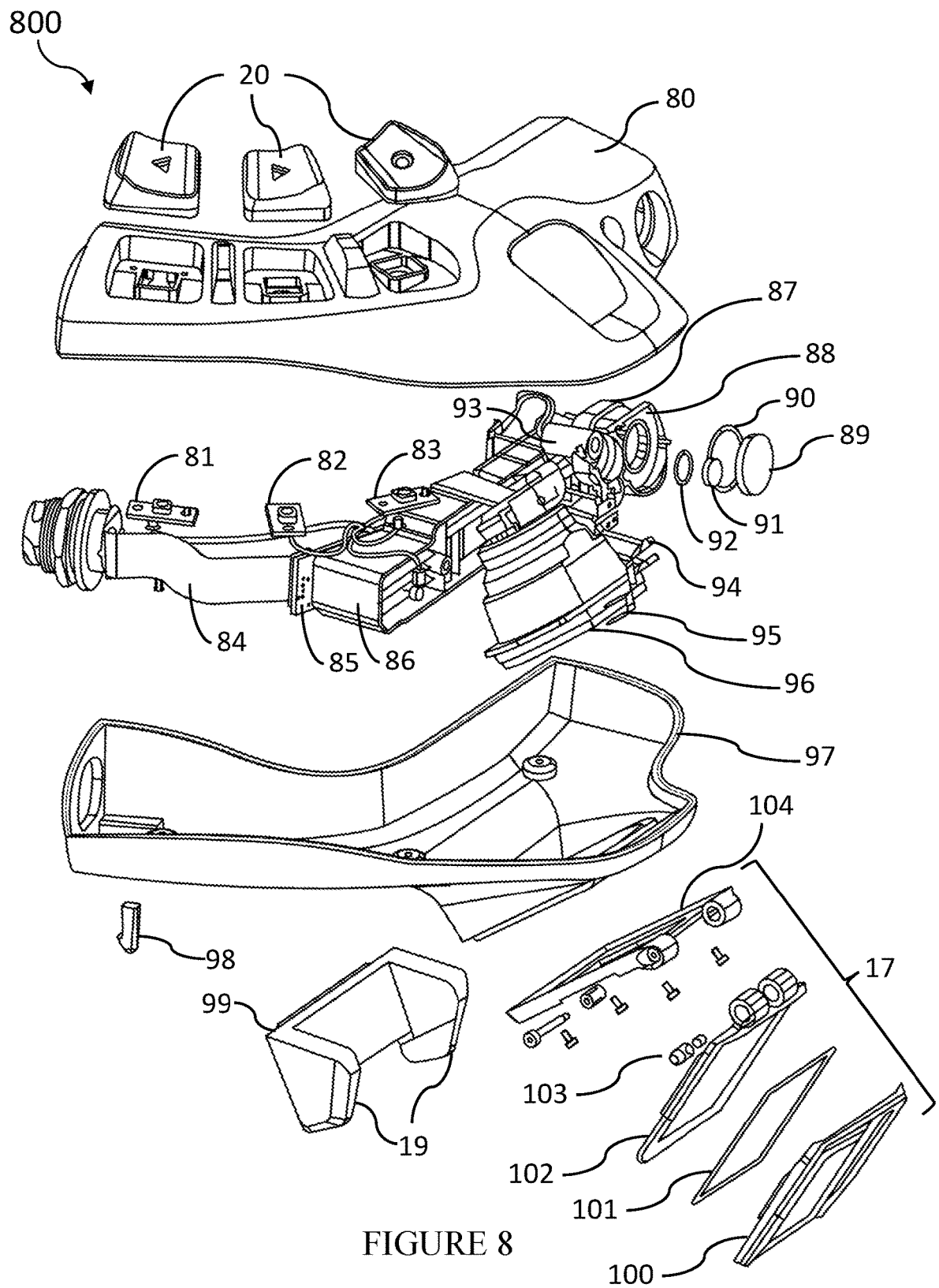
FIG. 8 is an exploded view of an exemplary vision module, in accordance with one or more embodiments.

FIG. 8 is an exploded view of an exemplary vision module, in accordance with one or more embodiments. Exploded view 800 shows an example of vision module 11 that includes HUD combiner subassembly 17 and user control button(s) 20, as well as a top housing 80, bottom housing 97, user control button PCBAs 81-83, flexible (i.e., flex) cable 84, vision module main PCBA 85, vision module heat sink 86, thermal camera rear mount 87, thermal camera 88, glass 89, retaining ring 90, laser glass 91 (covering laser aperture 74), laser aperture ring 92, laser 93, flex circuit 94, hall effect sensor 95, and optic subassembly 96. All like-numbered elements in FIG. 8 are the same or similar to their corresponding elements in other figures. In some examples, top housing 80 and bottom housing 97 (collectively, "vision module housing") may be plastic injection molded to form a hard plastic shell of impact resistant plastic having properties for withstanding extreme environments (e.g., high heat deflection temperature material properties). In some examples, top housing 80 and bottom housing 97 may be sealed together so that the vision module housing provides ingress protection against water and debris. In some examples, vision module bottom housing 97 may include features for fastening together with vision module top housing 80, as well as a window for a display image to exit. Bottom housing 97 may include sealing grooves around its perimeter to allow for a form-in-place gasket, adhesive, or separate sealing part.

User control button(s) 20 may comprise actuator switches configured to actuate user control button PCBAs 81-83. In an example, user control button PCBAs 81-83 each may include an electro-mechanical switch on a top surface and a small 230 connector on a bottom surface. A wire harness (not shown) may connect the 230 connector to vision module main PCBA 85. Cable connection interface 26 may be ingress protected and may make electrical connection(s) with PCBA 85 using flex cable 84.

Vision module 11 also may include heat sink 86 configured to store heat dissipated from electronic components of vision module 11. In some examples, heat sink 86 may comprise a heat sink core and a heat sink shell, and may be filled with phase change material (e.g., paraffin wax, other hydrocarbons, salt hydrate solutions, and the like) to provide thermal energy storage. For example, phase change material contained in heat sink 86 may be configured to phase change from a solid to a liquid, thereby storing heat dissipated from electronic components of vision module 11. This enables vision module 11 to operate in extreme environments where it is unable to transfer heat to ambient surrounding air.

Thermal camera rear mount 87 may couple to thermal camera 88, for example, positioned around thermal camera 88 to hold it in place. In some examples, thermal camera rear mount 87 may comprise an elastomeric material to provide shock absorption. Glass 89 may be made of germanium glass, including a window through which thermal camera 88 may see through (e.g., receive light and have a view of tracking a user's line of sight). Glass 89 may be retained (e.g., held in place) by retaining ring 90. Retaining ring 90 may be bonded into position in vision module top housing 80. Laser glass 91 also may be positioned (e.g., attached, glued, or otherwise secured) in laser aperture ring 92 in vision module top housing 80 and configured to cover laser aperture 74. Laser 93 (e.g., a pointing laser) may be placed such that it points out of laser aperture ring 92. Flex circuit 94 may connect vision module PCBA 85 to hall effect sensor 95 and optic subassembly 96. Hall effect sensor 95 may be positioned at the end of an ambient light sensor with flex circuit 94 positioned to sense if HUD combiner subassembly 17 is in an open or closed position. Optic subassembly 96 may comprise two or more functional subassemblies, including a display subassembly having an LCOS display and light engine and a lens subassembly comprising one or more lenses.

In some examples, vision module 11 includes retention latch 98 configured to interface with vision module attachment 14 (e.g., latch mechanism 24 thereon). In this example, bumper(s) 19, as described above, may be part of a front bumper 99.

Also shown in exploded view 800 are components of HUD combiner subassembly 17, including a world facing combiner shell 100, combiner glass 101, user facing combiner shell 102, and a combiner mount frame 104. In an example, combiner glass 101 may be adhesively bonded to world facing combiner shell 100 along its perimeter edge. World facing combiner shell 100 and user facing combiner shell 102 may be bonded together along their perimeter edges to trap combiner glass 101 in a sealed volume. World facing combiner shell 100 and user facing combiner shell 102 may be coated with a hydrophilic material to minimize fogging and optical distortion from moisture (e.g., by increasing water sheeting). World facing combiner shell 100, combiner glass 100, and user facing combiner shell 102, may be assembled with combiner mount frame 104, which may comprise a combiner pivot mechanism 103 (e.g., same or similar to axis of rotation and clutch mechanism 25). Combiner pivot mechanism 103 may be configured to allow a combiner display to hold an open position and allow for user adjustment to one or more pivot angles for improved viewing. In the example shown, the replaceable HUD combiner subassembly 17 may be attached and removed from vision module 11 using a plurality of screws (e.g., screwed through combiner frame 104).

Figure 9:
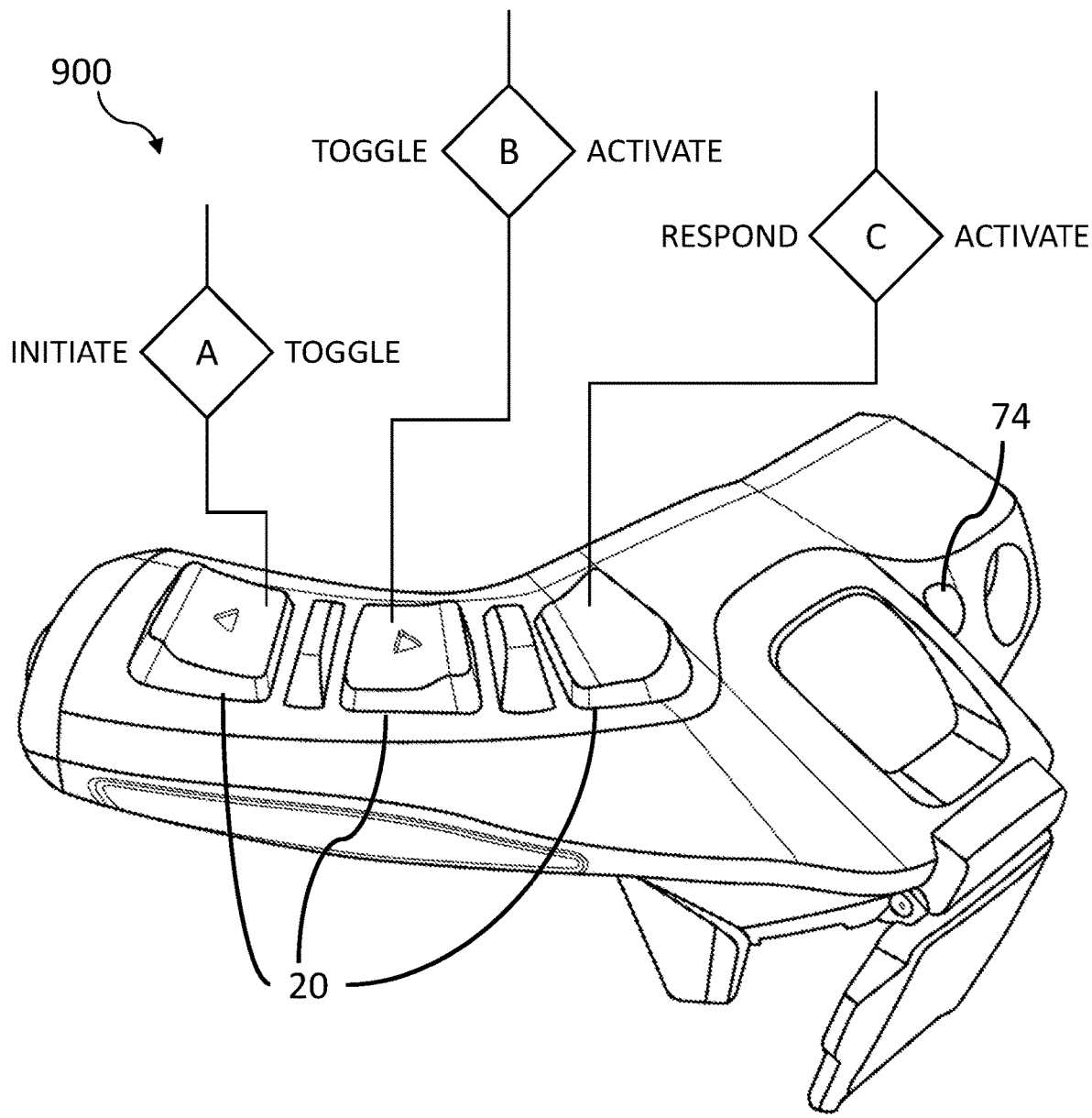
FIG. 9 is a perspective view of another exemplary vision module with components of a visual communications system, in accordance with one or more embodiments.

FIG. 9 is a perspective view of another exemplary vision module with components of a visual communications system, in accordance with one or more embodiments. View 900 shows user control buttons 20 and laser aperture 74. All like-numbered elements in FIG. 9 are the same or similar to their corresponding elements in other figures. One or more of user control buttons 20 may be used to control various navigation, vision, laser, messaging, alert (i.e., notification) functions. Each of user control buttons 20 may respond to a quick press, a long press (e.g., for a length of time, for example, a number of seconds) and/or press and hold (e.g., for another length of time), to indicate various commands and changes to a component of a visual communications system, such as a laser configured to point out of laser aperture 74 and various lights (e.g., tail lights 1002a-1002b, 1004a-1004b, 1202a-p) as described herein. In an example, a quick press, press and hold for a shorter length of time, and press and hold for a longer length of time, of one of user control buttons 20 may perform one or a combination of the following functions:
  toggle between vision modes,
  toggle between compass/pointer options (e.g., exit, finding a location of a mayday alert from a downed response personnel, magnetic compass, finding or tracking a path to safety),
  activate a laser (e.g., pointing laser, as described herein),
  select a response or dismissal to a message,
  acknowledge an alert,
  dismiss a notification (e.g., status notification),
  initiate a mayday alert,
  personnel accountability (e.g., PAR), and
  other functions.
In some examples, user control button(s) 20, laser 93, and HUD combiner subassembly 17 may comprise components of a visual communication system, along with rear communication light(s) and vision module light(s), as described below.

Figure 10A:
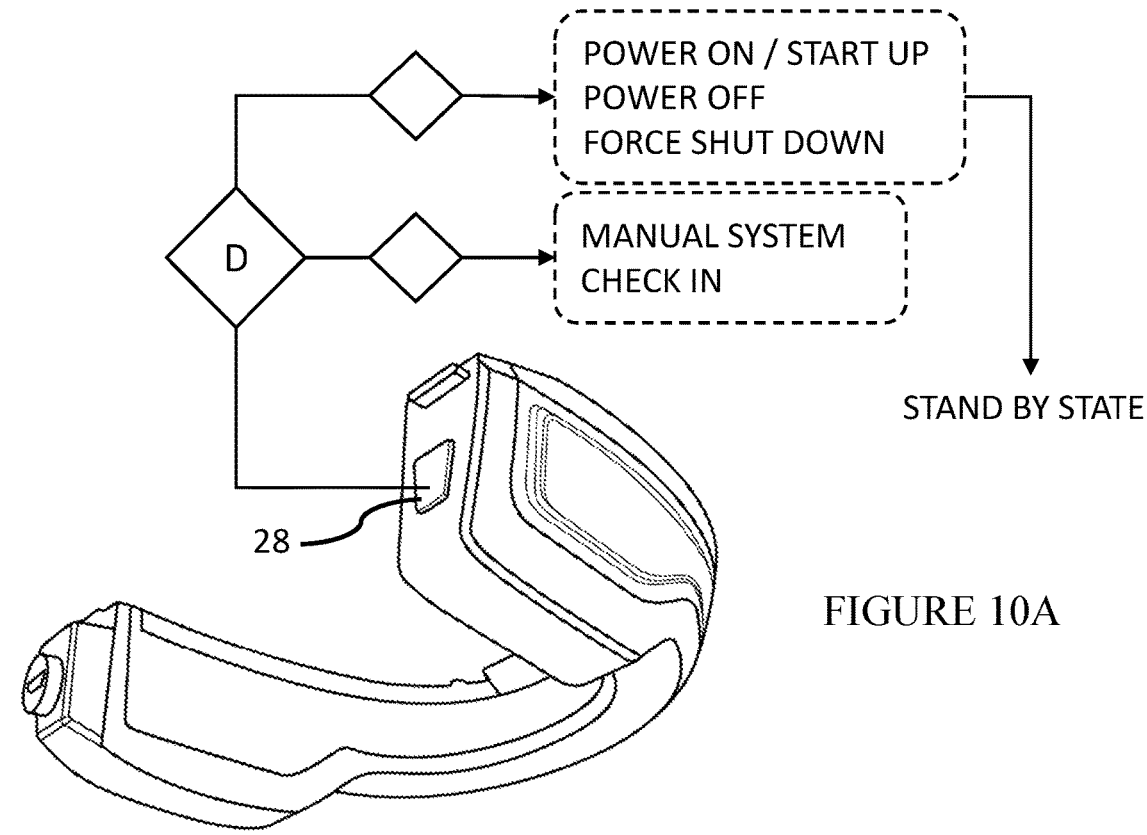
FIG. 10A is a front perspective view of an enclosure of an exemplary compute module with power button, in accordance with one or more embodiments.

FIG. 10A is a front perspective view of an enclosure of an exemplary compute module with power button, in accordance with one or more embodiments. As shown, power button 28 may be configured to turn power on and off to some or all electrical components of compute module 12 and other modules in a helmet mounted visual communication and navigation system. In an example, a quick press of power button 28 may initiate a manual system check in, while a press and hold for a given number of seconds may power the system on (e.g., start up the system), power it off, or force shutdown, depending on a current power status of the system.

Figure 10B:
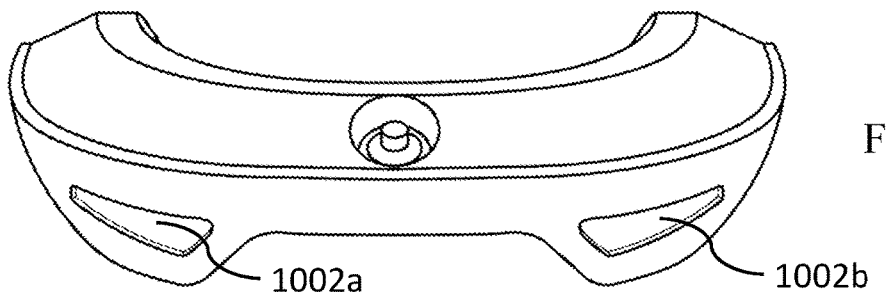
FIGS. 10B-10C are back views of an enclosure of an exemplary compute module with rear communication lights, in accordance with one or more embodiments.
Figure 10C:
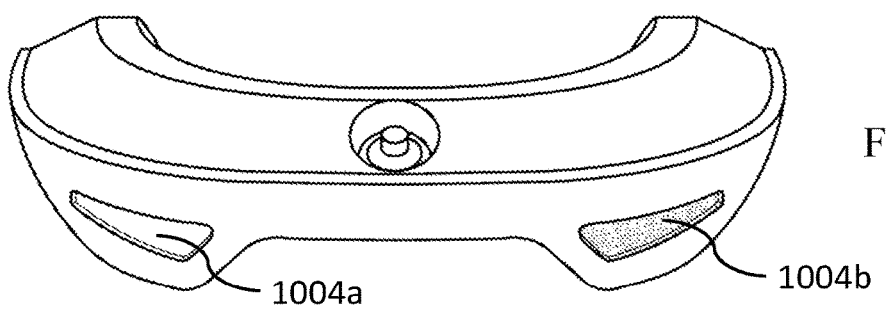

FIGS. 10B-10C are back views of an enclosure of an exemplary compute module with rear communication lights, in accordance with one or more embodiments. In this example, rear communication lights are shown as two a tail and/or brake light facing backward (e.g., projecting light directly backward, left backward, right backward, and other backward relative directions) on a compute module housing (e.g., compute module 12 housing). In this disclosure, the terms "rear communication light" and "tail light" are used interchangeably. In some examples, the lights may comprise light-emitting diode (LED) lights. In some examples, a user control button (e.g., one or more of user control buttons 20) may be used to control a color, blinking pattern, other patterns (e.g., color sequence or change, fading, rolling, messaging, etc.) and/or brightness (e.g., bright, medium, low, off) of such rear communication lights. In some examples, a user control button may be used to change a mode (e.g., always on, fast and slow flashing (e.g., blinking, pulsing), color switching flashing, color combination flashing, off) of said rear communication lights. Different colors, brightness, blinking (i.e., flashing) patterns, and other patterns (e.g., changing colors, repetitive color sequence, rotating light, fading side-to-side, etc.) may be used to indicate differing states (e.g., idle-normal operational state, rapid intervention crew/rescue, critical state, non-critical messaging and/or notification state). In an example, tail lights 1002a-1002b may be exhibiting the same color, blink rate, and/or pattern. Said color, blink rate, and/or pattern may indicate a state or alert, as described herein. In another example, tail lights 1004a may be a exhibiting a different color, blink rate, and/or pattern, from tail light 1004b, the combination of the differing color(s), blink rates, and/or patterns may indicate another state or alert. In some examples, these states, alerts, and other signals indicated by tail lights 1002a-1002b and 1004a-1004b may be related to an emergency response, military, law enforcement, public safety effort or mission. In other examples, there may be a single rear communication light or more than two rear communications lights.

Figure 11A:
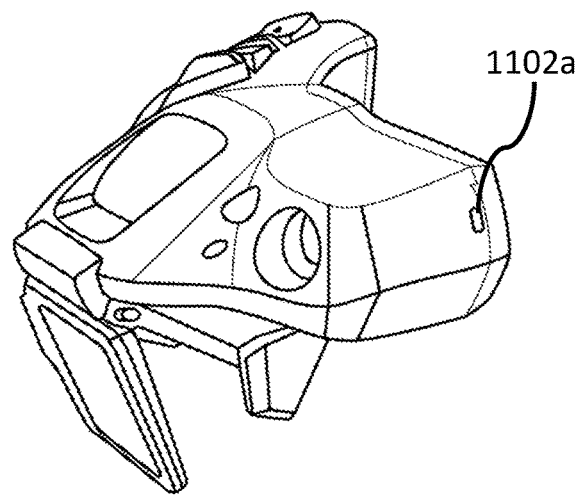
FIGS. 11A-11D are perspective views of an exemplary vision module with an indicator light, in accordance with one or more embodiments.
Figure 11B:
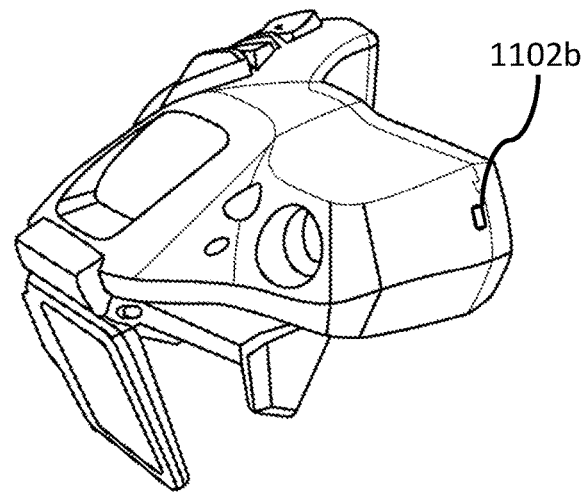
Figure 11C:
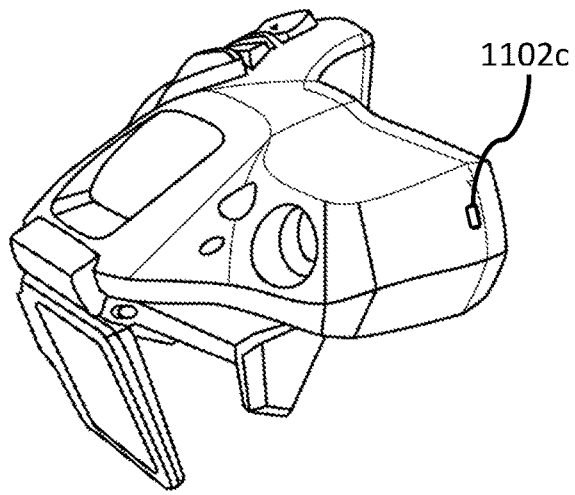
Figure 11D:
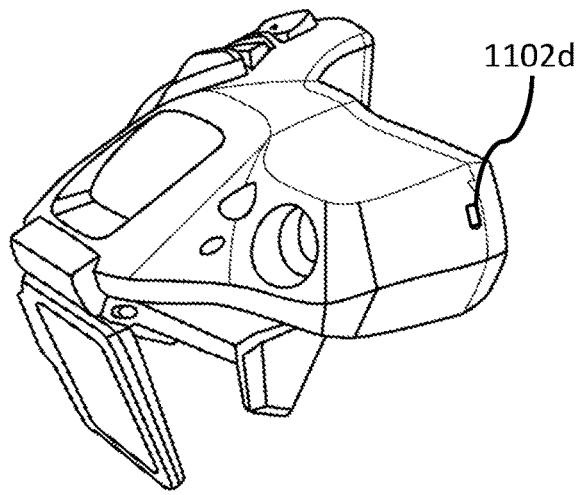

FIGS. 11A-11D are perspective views of an exemplary vision module with an indicator light, in accordance with one or more embodiments. An indicator light 1102a-d (e.g., LED) is shown on a vision module (e.g., vision module 11, described herein) to indicate various modes of said vision module. As shown in FIGS. 11A-11B, an off light 1102a may indicate the vision module is not receiving power, while an on (e.g., green) light 1102b may indicate the vision module is receiving power normally. As shown in FIGS. 11C-11D, different colors or patterns may indicate different types of problems. In an example, a first color or pattern light 1102c may indicate a hardware problem, and a second color or pattern light 1102d may indicate a software problem.

Figure 12C:
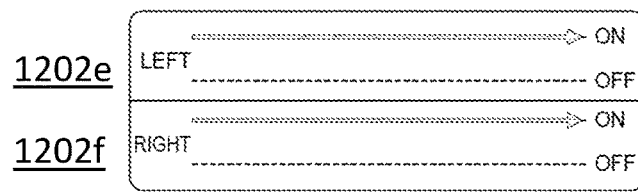
Figure 12C:
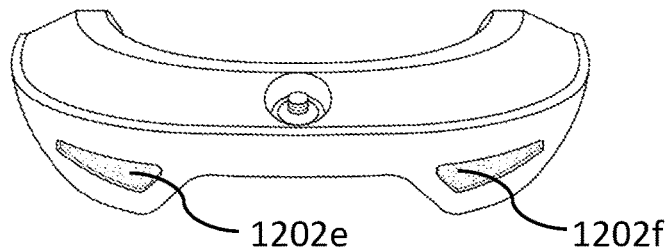
Figure 12D:
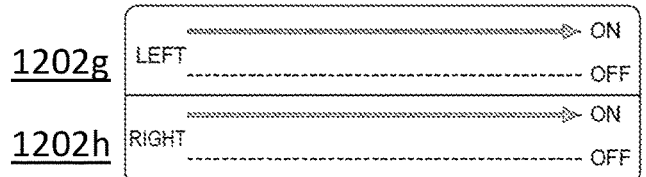
Figure 12D:
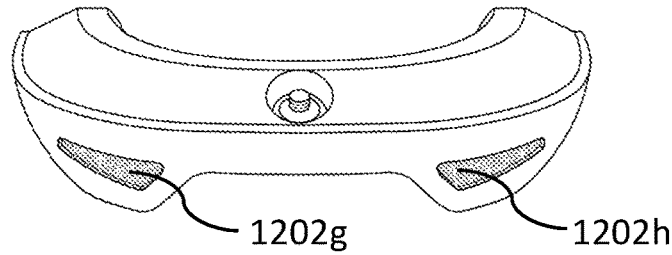

FIGS. 12A-12H are diagrams showing exemplary visual communication signals being expressed by rear communication lights. In some examples, the visual communication signals expressed by rear communication lights may be related to an emergency response, military, law enforcement, public safety effort or mission. In FIG. 12A, a connecting signal (e.g., caused by manipulation of a user control button, as described herein) may comprise no light in left tail light 1202a, and a blinking (e.g., flashing, pulsing, etc.) right tail light 1202b. In this example, right tail light 1202b is alternating on and off for 400 ms intervals. In some examples, the connecting signal may be given in a neutral color (e.g., green, blue, yellow). In FIG. 12B, a dispatched signal may comprise alternating on and off lights in left tail light 1202*c* and right tail light 1202*d* for 300 ms intervals (e.g., left tail light 1202*c* off and right tail light 1202*d* on for 300 ms, then left tail light 1202*c* on and right tail light 1202*d* off for the next 300 ms, and so on). In some examples, the dispatched signal may be given in a different neutral color from the connecting signal. In FIG. 12C, an idle signal (e.g., controlled by a button configured for indicating standard mode responses) may comprise left tail light 1202*e* and right tail light 1202*f* both on, for example, of a particular color, pattern, or combination of colors and/or patterns. In FIG. 12D, a personnel accountability (i.e., PAR or other personnel check-in) signal may comprise left tail light 1202*g* and right tail light 1202*h* both on, for example, of a another color, pattern, or combination of colors and/or patterns. In FIG. 12E, another idle signal (e.g., controlled by a button configured for indicating may day mode responses) may comprise a pattern being repeated by both left tail light 1202*i* and right tail light 1202*j*, for example, in sync. In FIG. 12F, a may day signal may comprise both left tail light 1202*k* and right tail light 1202*l* being on together, for example, with the same color and brightness (e.g., a red, orange, or other color with a high brightness level to optimize ease of viewing in a hazardous environment). In FIG. 12G, an alert signal may comprise no light in a left tail light 1202*m* and an alternating light intensity or color in right tail light 1202*n*, for example, in 300 ms intervals. In FIG. 12H, an evacuation signal may comprise alternating on/off lights between left tail light 1202*o* and right tail light 1202*p*, for example, in a color and/or brightness level (e.g., bright red, bright orange, etc.) to optimize ease of viewing in a hazardous environment. In this example, the left tail light 1202*o* may be off first while the right tail light 1202*p* is on, and then vice versa, in 200 ms intervals. Each of the signal types described herein may be implemented in various different patterns (e.g., time intervals), colors, brightness, etc. In some examples, evacuation and may day signals also may be indicated by a pointing laser (e.g., on a vision module, as described herein), in addition to the visual signals being indicated by tail lights. As shown in FIGS. 12A-12H, other signals that might be indicated using any of the tail lights (i.e., rear communication lights) described herein may include an assigned signal, a response signal, a safe signal, an evacuation end signal, a may day end signal, other end signal, and still other signals.

Figure 12I:
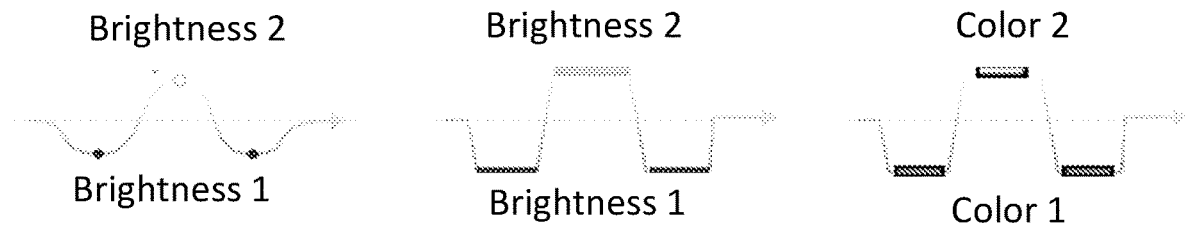
FIG. 12I are signal charts showing additional exemplary light patterns that may be expressed by rear communication lights.

FIG. 12I are signal charts showing additional exemplary light patterns that may be expressed by rear communication lights. As shown, any of the rear communication lights described herein may exhibit a light pattern that varies (e.g., pulses, fades, otherwise changes) between two or more brightness levels (e.g., brightness 1 and brightness 2) according to a pattern (e.g., cadence, sequence). In another example, any of the rear communication lights described herein may exhibit a light pattern that varies between two or more colors (e.g., color 1 and color 2) according to a pattern.

Figure 13:
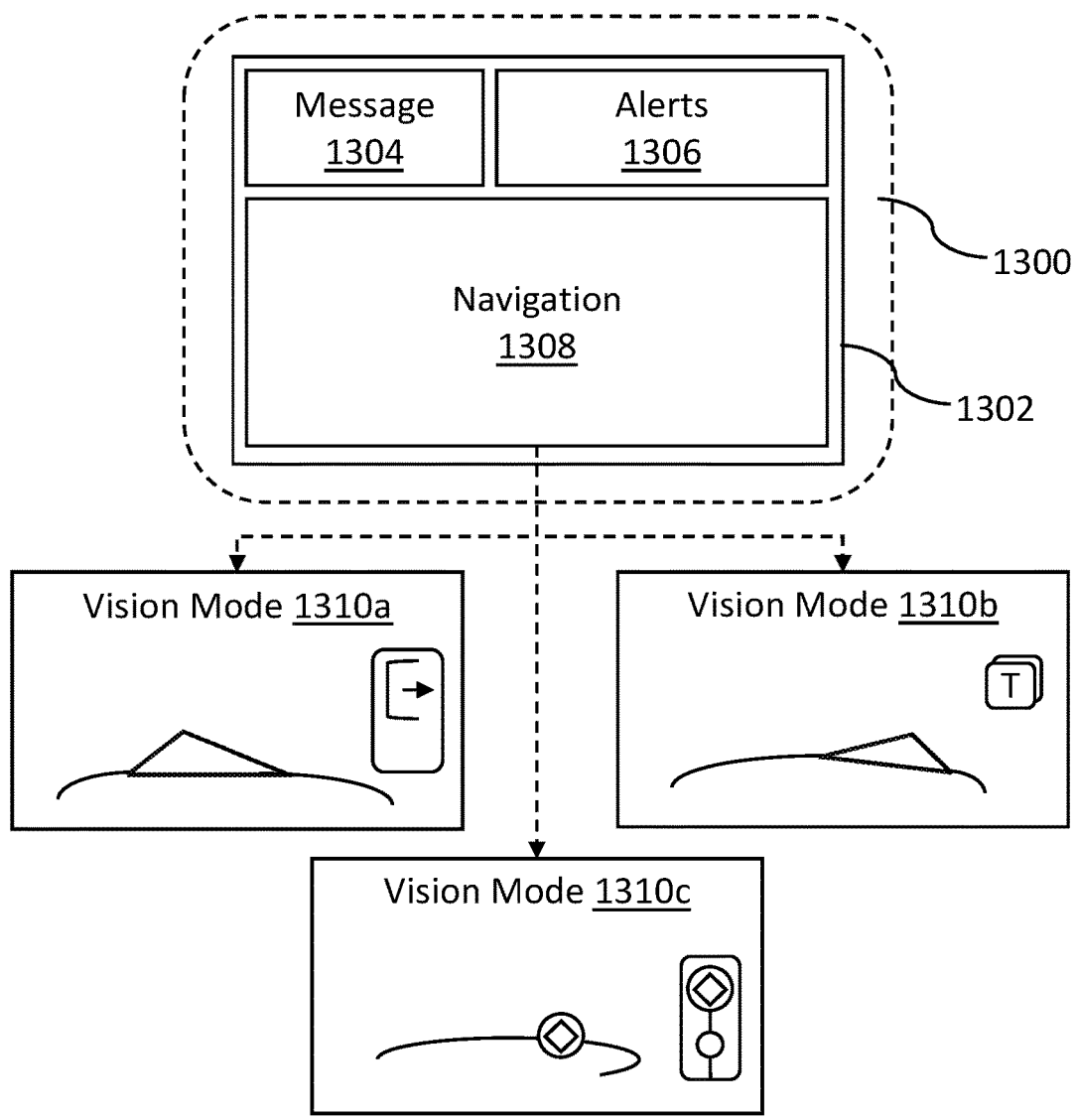
FIG. 13 is a simplified block diagram showing an exemplary graphical user interface (GUI) displayed on a HUD, in accordance with one or more embodiments.

FIG. 13 is a simplified block diagram showing an exemplary graphical user interface (GUI) displayed on a HUD, in accordance with one or more embodiments. Wireframe 1300 shows an exemplary layout for a GUI 1302 that may be displayed by a HUD (e.g., HUD combiner subassembly 17) facing a user. GUI 1302 may comprise a message section 1304, an alerts section 1306, and a navigation section 1308. In some examples, message section 1304 may be displayed in a top left portion of GUI 1302, alerts section 1306 may be displayed in a top right portion of GUI 13042 and navigation section 1308 may be displayed in a bottom half or more of GUI 1302. In some examples, alerts section 1306 may be configured to display critical (e.g., urgent) alerts in a clear and simple manner, including evacuation and may day alerts. In other examples, each of these sections may be in different parts of GUI 1302 (e.g., message section 1304 on bottom left or right, alerts section 1306 on top left or bottom right or bottom left, navigation section 1308 in a central portion, a top portion, a left portion, a right portion). In some examples, one or more sections in GUI 1302 may be implemented in a horizontal orientation. In other examples, one or more sections in GUI 1302 may be implemented in a vertical orientation. In still other examples, more or fewer sections may be shown using GUI 1302.

In some examples, navigation section 1308 may be configured to display two or more vision modes, alternately. For example, a user may toggle between vision modes 1310*a*-1310*c* using control buttons (e.g., user control buttons 20). In another example, navigation section 1308 may change from one to another of vision modes 1310*a*-1310*c* automatically in response to a status change, an alert or other notification, or other input. The status change, alert, notification, or other input may be caused by a control center (e.g., mission control), another user (e.g., linked to a same mission or otherwise linked to a same user/personnel group), or other source. In some examples, one or more of vision mode 1310*a*, vision mode 1310*b*, and vision mode 1310*c* may comprise a compass, pointer, or other navigation-related graphic indicating a current direction of travel and/or a recommended direction of travel (e.g., in order to reach a destination, an exit, another user, etc.). In other examples, one or more of vision mode 1310*a*, vision mode 1310*b*, and vision mode 1310*c* may comprise a map (e.g., 2D map, 3D map, infrared, geographical, heat, etc.). In still other examples, on or more of vision mode 1310*a*, vision mode 1310*b*, and vision mode 1310*c* may comprise an enhanced visualization of a user's point-of-view. In some examples, said enhanced visualization may comprise one, or a combination, of raw thermal images, edge enhanced images, heat map or indication of hot spots, a gray scale rendering, and other visualizations configured to enhance a user's awareness of their environment, particularly in hazardous environments where smoke, debris, low light, and other environmental factors can obscure normal vision. In some examples, one or more of vision mode 1310*a*, vision mode 1310*b*, and vision mode 1310*c* also may comprise an icon indicating the mode, a status, a user identification (e.g., of the user wearing the device, of one or more other users). In some examples, one or more of vision mode 1310*a*, vision mode 1310*b*, and vision mode 1310*c* may be configured to assist a user in performing one, or a combination, of the following: locating an exit, finding a location of a may day alert by a downed response personnel, and following a path to a safe location. In other examples, said vision modes may assist a user in other ways and to perform other tasks related to an emergency response, military, law enforcement, public safety effort or mission.

Persons of ordinary skill in the art will understand that lights, lasers, and other indicators described herein may be implemented with different types of visual indicators than described herein. A person of ordinary skill in the art will recognize that the systems described herein may be implemented on various types of protective headgear used by emergency response personnel and critical workers for any type of emergency response, military, law enforcement, public safety, and other similar efforts and missions.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A visual communication system on a helmet mounted navigation and communication system, comprising:
   a pointing laser on a vision module, the pointing laser configured to point forward in a direction of a user's point of view (POV);
   a rear communication light configured to project light in a backward direction from the user's POV;
   a graphical user interface (GUI) on a heads up display (HUD); and
   a user control button configured to control one, or a combination, of the pointing laser, the rear communication light, and one or more elements of the GUI.

2. The system of claim 1, wherein the pointing laser and the rear communication light are configured to indicate one or more visual signals relating to an emergency response.

3. The system of claim 1, wherein a user manipulation of the user control button is configured to cause an action by the one, or a combination, of the pointing laser, the rear communication light, and one or more elements of the GUI.

4. The system of claim 2, wherein the user manipulation comprises one, or a combination, of a quick press, a long press, a press and hold, and a pattern of presses.

5. The system of claim 2, wherein the user manipulation of the user control button is configured to cause the rear communication light to toggle between an on and off mode.

6. The system of claim 2, wherein the user manipulation of the user control button is configured to cause the rear communication light to indicate one, or a combination, of a connecting signal, a dispatched signal, an idle signal, a may day signal, an evacuation signal, a personnel accountability signal, a response signal, a safe signal, an assigned signal, an evacuation end signal, a may day end signal, and an other end signal.

7. The system of claim 2, wherein the user manipulation of the user control button is configured to cause a change to a vision mode.

8. The system of claim 7, wherein the vision mode is configured to cause the GUI to display a compass.

9. The system of claim 7, wherein the vision mode is configured to cause the GUI to display a map.

10. The system of claim 7, wherein the vision mode is configured to cause the GUI to display an enhanced visualization of an environment from the user's POV.

11. The system of claim 7, wherein the vision mode is configured to cause the GUI to display one or more elements configured to assist a user in performing one, or a combination, of the following: locating an exit, finding a location of a may day alert by a downed response personnel, and following a path to a safe location.

12. The system of claim 11, wherein the one or more elements comprises one, or a combination, of a message section, an alerts section, and a navigation section.

13. The system of claim 1, wherein the user manipulation of the user control button is configured to cause the pointing laser to indicate a signal using one, or a combination, of a color, a brightness, and a blinking pattern.

14. The system of claim 1, further comprising an indicator light on the vision module, the indicator light configured to display a color and/or a pattern to indicate one, or a combination, of whether the vision module is receiving power, whether there is a hardware problem, whether there is a software problem.

15. The system of claim 1, wherein the rear communication light comprises a light-emitting diode (LED) light.

16. The system of claim 1, wherein the user control button is further configured to perform one, or a combination, of the following: select a response, dismiss a message, acknowledge an alert, dismiss a notification, and initiate a may day alert.

17. The system of claim 1, wherein the user control button is further configured to cause the rear communication light to exhibit a light pattern.

18. The system of claim 1, wherein the user control button is further configured to cause the rear communication light to change color.

19. The system of claim 1, wherein the user control button comprises two or more buttons.

20. The system of claim 19, wherein at least two user control buttons are separated by a finger placement guide configured to assist a user wearing gloves in distinguishing between a location of the at least two user control buttons.

* * * * *